US011668141B2

(12) United States Patent
Boisne et al.

(10) Patent No.: US 11,668,141 B2
(45) Date of Patent: *Jun. 6, 2023

(54) DISRUPTIVE COUPLING SYSTEMS AND METHODS FOR SUBSEA SYSTEMS

(71) Applicant: J. RAY MCDERMOTT S.A., Houston, TX (US)

(72) Inventors: Mathieu Boisne, Houston, TX (US); Julie Ingram, Fulshear, TX (US)

(73) Assignee: J. Ray McDermott, S.A., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,081

(22) Filed: Dec. 27, 2021

(65) Prior Publication Data

US 2022/0195818 A1 Jun. 23, 2022

Related U.S. Application Data

(63) Continuation of application No. 17/091,766, filed on Nov. 6, 2020, now Pat. No. 11,208,855.

(60) Provisional application No. 62/933,862, filed on Nov. 11, 2019.

(51) Int. Cl.
*E21B 17/02* (2006.01)
*E21B 19/00* (2006.01)

(52) U.S. Cl.
CPC ............ *E21B 19/006* (2013.01); *E21B 17/02* (2013.01)

(58) Field of Classification Search
CPC ................................ E21B 17/02; E21B 19/006
See application file for complete search history.

(56) References Cited

U.S. PATENT DOCUMENTS

| | | | | |
|---|---|---|---|---|
| 4,724,970 A | * | 2/1988 | Kuhn | B66C 13/02 |
| | | | | 294/82.16 |
| 7,137,450 B2 | * | 11/2006 | Johansen | F15B 21/006 |
| | | | | 166/332.7 |
| 7,934,561 B2 | * | 5/2011 | Ormond | F15B 15/14 |
| | | | | 254/277 |
| 9,038,433 B2 | * | 5/2015 | Skjetne | E21B 43/01 |
| | | | | 73/1.71 |
| 9,656,800 B2 | * | 5/2017 | Donahue | B65D 88/78 |
| 9,718,653 B2 | * | 8/2017 | Bergem | F16F 9/061 |
| 10,287,136 B2 | * | 5/2019 | Bergem | B66C 13/02 |
| 10,781,670 B1 | * | 9/2020 | Cargol, Jr. | E21B 33/035 |
| 11,208,855 B2 | * | 12/2021 | Boisne | E21B 17/02 |

(Continued)

FOREIGN PATENT DOCUMENTS

CN 108571497 A 9/2018
WO WO-2017183991 A1 * 10/2017 ............. E21B 17/07

OTHER PUBLICATIONS

Janet L. Anderson, "NASA Technology Has Stabilizing Effect for Rockets and Buildings", NASA Jul. 11, 2013.

(Continued)

*Primary Examiner* — Matthew R Buck
(74) *Attorney, Agent, or Firm* — Patterson + Sheridan, LLP

(57) ABSTRACT

Aspects of the present disclosure relates to disruptive coupling systems and methods, and apparatus thereof, for subsea systems. The subsea systems may be subsea oil and gas systems. In one implementation, a subsea system includes a subsea component disposed in seawater, and a disruptive coupling device coupled to the subsea structure and/or surrounding fluid.

17 Claims, 3 Drawing Sheets

(56) References Cited

U.S. PATENT DOCUMENTS

| | | | | |
|---|---|---|---|---|
| 2003/0037544 | A1* | 2/2003 | Armstrong | E21B 33/0355 |
| | | | | 60/413 |
| 2013/0340421 | A1* | 12/2013 | Groben | E21B 33/064 |
| | | | | 60/413 |
| 2014/0262656 | A1* | 9/2014 | Song | F16F 7/116 |
| | | | | 188/378 |
| 2019/0195306 | A1* | 6/2019 | Mobeck | F16F 9/20 |
| 2019/0338482 | A1* | 11/2019 | Lund | F16F 7/08 |
| 2019/0353218 | A1 | 11/2019 | Berry et al. | |
| 2019/0353222 | A1 | 11/2019 | Berry et al. | |

OTHER PUBLICATIONS

International Search Report and Written Opinion dated Feb. 22, 2021, for Application No. PCT/2020/059380.
First Examination Report dated Sep. 27, 2022 for Application No. 202217029252.

* cited by examiner

DISRUPTIVE COUPLING SYSTEMS AND METHODS FOR SUBSEA SYSTEMS

CROSS-REFERENCE TO RELATED APPLICATIONS

This application is a continuation application of and hereby claims priority under 35 U.S.C. § 120 to pending U.S. patent application Ser. No. 17/091,766, filed Nov. 6, 2020, which claims priority to U.S. Provisional Patent Application Ser. No. 62/933,862, filed Nov. 11, 2019, which are herein incorporated by reference in their entirety.

BACKGROUND

Field

Aspects of the present disclosure relate to disruptive coupling systems and methods, and apparatus thereof, to achieve optimization of the modal gain envelope for subsea systems. The subsea systems may be subsea hydrocarbon production systems and related equipment, such as subsea oil and gas systems.

Description of the Related Art

Oceanic waves and current can affect subsea equipment both while the equipment is being installed and after installation, such as during operation. Waves and current may induce loads which limit the weather window for subsea equipment. The weather window is the set of allowable combinations of wave and current during which the equipment can be installed. Waves and current may also limit the operational lifespan of installed subsea equipment. As an example, the waves and current may induce vibration and/or motion of the equipment (herein also referred to as the modal response) that limits the operational lifespan and/or weather window of the equipment. The magnitude of the response varies with the magnitude, direction, and/or frequency of the applied load.

Therefore, there is a need for simple and cost-effective systems that facilitate reduced wave and/or current induced vibration or motion of subsea equipment, to facilitate increased weather windows, and/or increased operational lifespans.

SUMMARY

Aspects of the present disclosure relate to disruptive coupling systems and methods, and apparatus thereof, to achieve optimization of the modal gain envelope for subsea systems. The subsea systems may be subsea hydrocarbon production systems and related equipment, such as subsea oil and gas systems.

In one implementation, a subsea system includes a subsea component for disposal in seawater, and a disruptive coupling device coupled to the subsea component. The disruptive coupling device includes a bladder enclosing at least partially a fluid, and the disruptive coupling device is configured to move at least a portion of the fluid in response to a load applied by the seawater.

In one implementation, a subsea installation system includes an installation vessel including one or more lifting devices, and a subsea component disposed in seawater and supported at least partially on the installation vessel. The subsea installation system also includes a disruptive coupling device coupled to the subsea component. The disruptive coupling device includes a bladder enclosing at least partially a fluid, wherein the disruptive coupling device is configured to move at least a portion of the fluid in response to a load applied by the seawater In one implementation, a subsea system includes a subsea component disposed in seawater, and a disruptive coupling device coupled to the subsea component. The disruptive coupling device includes a chamber housing, and a chamber disposed within the chamber housing. The chamber has a compressible fluid in an upper portion of the chamber, and a second fluid in a lower portion of the chamber. The disruptive coupling device also includes a barrier wall and a check valve disposed between the lower portion and the upper portion.

BRIEF DESCRIPTION OF THE DRAWINGS

So that the manner in which the above-recited features of the disclosure can be understood in detail, a more particular description of the disclosure, briefly summarized above, may be had by reference to implementations, some of which are illustrated in the appended drawings. It is to be noted, however, that the appended drawings illustrate only common implementations of this disclosure and are therefore not to be considered limiting of its scope, for the disclosure may admit to other equally effective implementations.

Figure 1:
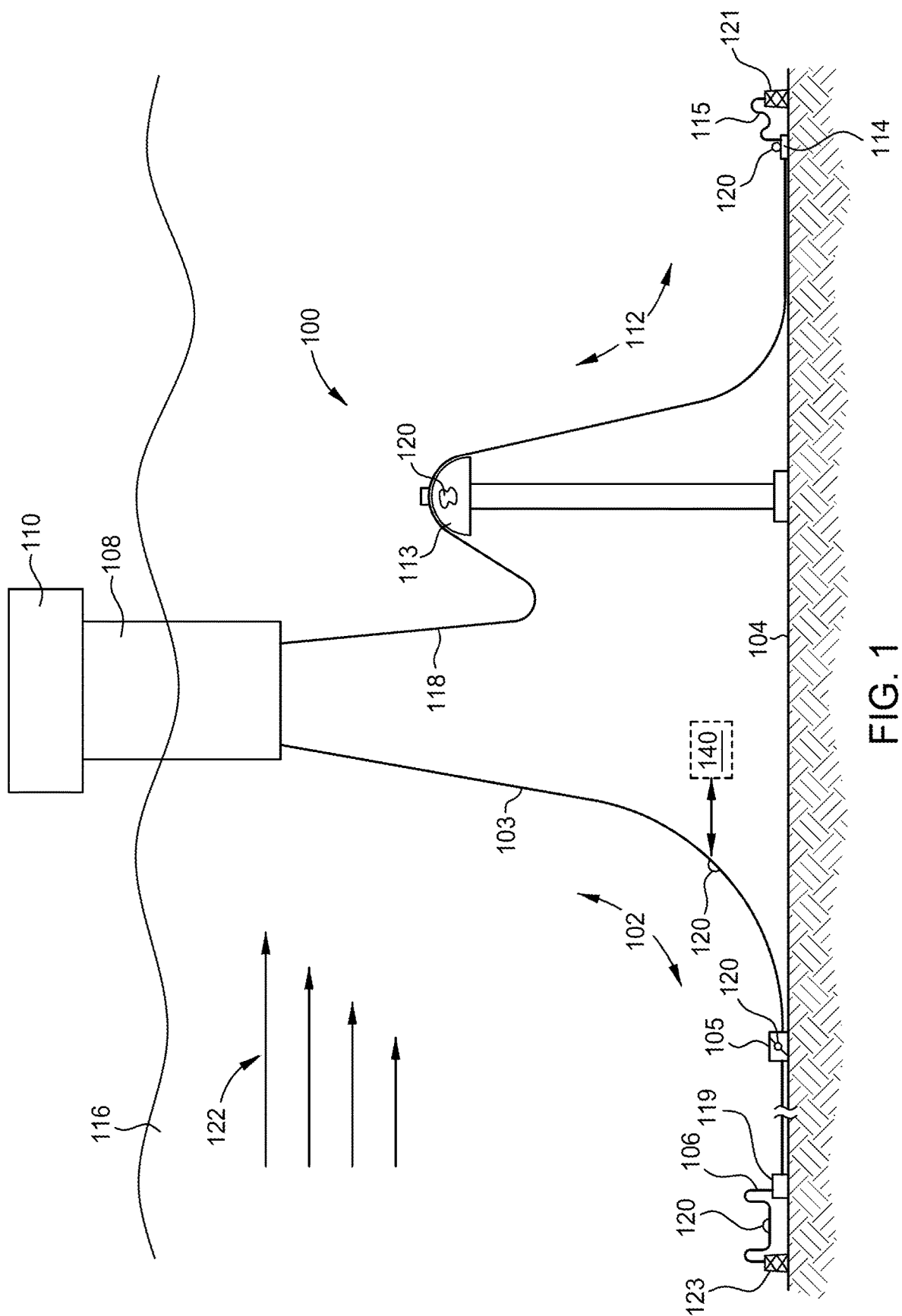
FIG. 1 is a schematic view of a subsea system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to disruptive coupling systems and methods, and apparatus thereof, for subsea systems. The subsea systems may be subsea oil and gas systems.

FIG. 1 is a schematic view of a subsea system 100, according to one implementation. The subsea system 100 is a subsea oil and gas system. The subsea system 100 may operate in conjunction with a fixed or floating offshore structure 108 disposed at sea level. The floating offshore structure 108 may be moored to a seafloor 104 of the ocean. The floating offshore structure 108 may include surface equipment 110 for producing oil and gas. The oil and gas surface equipment receives produced fluids or may send other fluids to the subsea system 100. The offshore structure 108 may or may not be present and can include but is not limited to a fixed or floating production platform of any hull type or a fixed or floating surface or mid-water structure or buoy. In one embodiment, which can be combined with other embodiments, the subsea system 100 is disposed as a stand-alone system on the seafloor 104.

The subsea system 100 includes a first set of subsea equipment 102 installed between the offshore structure 108 and the seafloor 104 as well as equipment on the seafloor 104. The subsea system 100 may include any number of subsea components, such as but not limited to subsea components 103, 105 106, and 119. The subsea system 100 may include any number of additional sets of equipment such as a second set of subsea equipment 112, including subsea components such as but not limited to subsea components 113, 114, 115, and 118. Each set of subsea equipment 102, 112 may contain one or more subsea components including but not limited to risers in any configuration, umbilicals, flowlines, manifolds, in-line structures, jumpers, pipeline end terminations (PLET's), pipeline end manifolds (PLEM's), subsea storage equipment, subsea processing equipment, midwater buoys, midwater arches, and/or midwater structures. One or more of the subsea components 103, 105, 106, 113, 114, 115 118, and/or 119 may include but are not limited to one or more of risers in any configuration, umbilicals, flowlines, manifolds, in-line structures, jumpers, pipeline end terminations (PLET's), pipeline end manifolds (PLEM's), subsea storage equipment, subsea processing equipment, midwater buoys, midwater arches, and/or midwater structures.

In the implementation shown in FIG. 1, each of the subsea component 103 and the subsea component 118 includes one or more risers, one or more umbilicals, one or more flowlines, and/or one or more manifolds. Each of the subsea component 105, the subsea component 119, and/or the subsea component 114 includes one or more of a pipeline end termination (PLET), a pipeline end manifold (PLEM), subsea storage equipment, and/or subsea processing equipment. The subsea component 113 includes a midwater arch that supports the subsea component 118. The present disclosure contemplates that the subsea component 113 can include a midwater buoy or a midwater structure. Each of the subsea component 115 and the subsea component 106 includes one or more umbilicals, one or more flowlines, and/or one or more manifolds. The subsea component 115 is coupled to a wellhead structure 121 and the subsea component 106 is coupled to a wellhead structure 123. Each of the wellhead structures 121, 123 can include a subsea tree or other wellhead structure.

One or more of the subsea components 103, 105, 106, 113, 114, and/or 115 includes a disruptive coupling device 120 coupled thereto. FIG. 1 illustrates one disruptive coupling device 120 coupled to one or more subsea components such as, but not limited to 103, 105 and/or 106 of the first set of subsea equipment 102. The present disclosure contemplates that the second set of subsea equipment 112 can have a disruptive coupling device coupled thereto that includes one or more of the same features, aspects, components, and/or properties of disruptive coupling device 120 coupled to one or more subsea components of the first set of subsea equipment 102. The present disclosure contemplates that multiple disruptive coupling devices 120 may be used in tandem in the subsea system 100.

Figure 2:
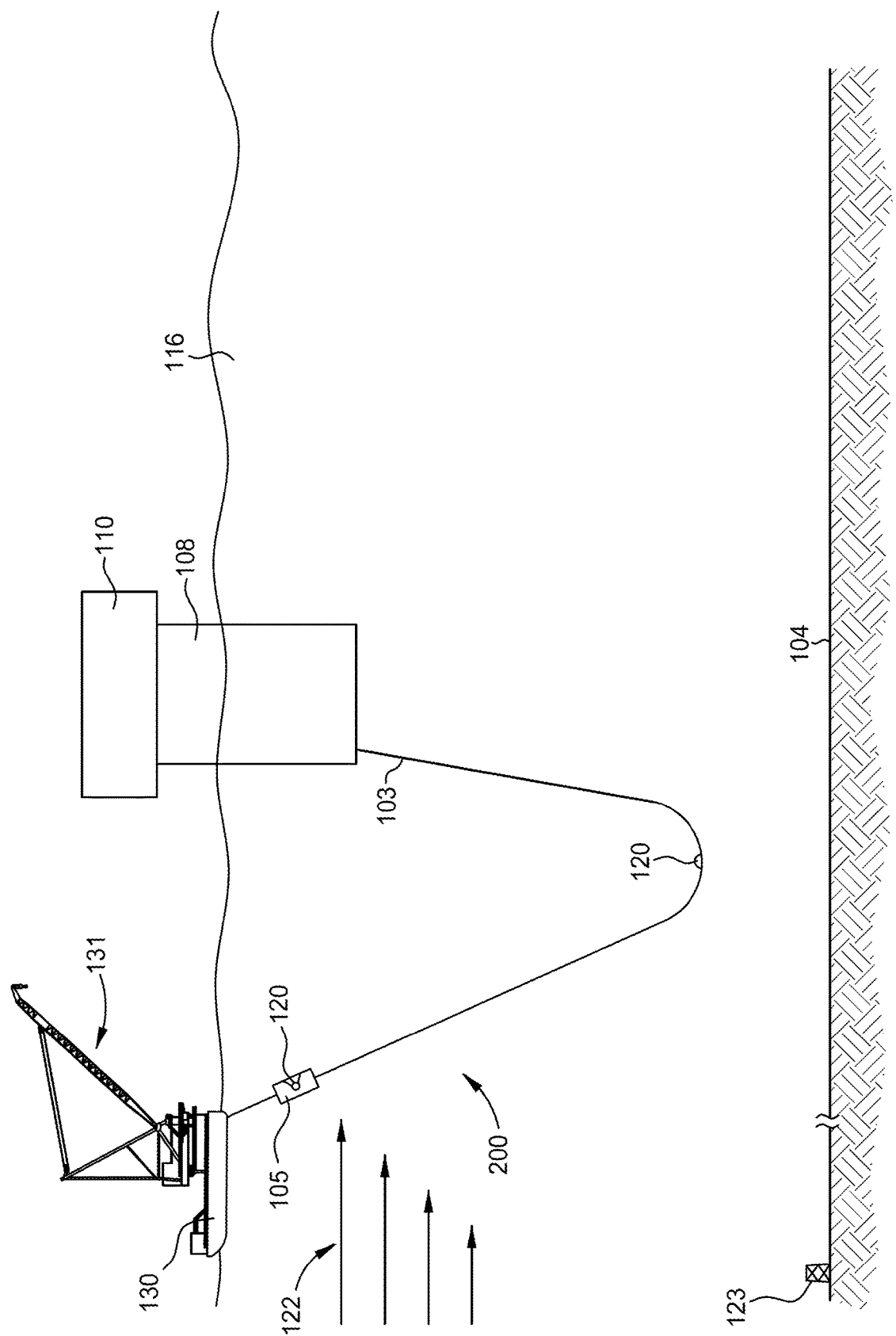
FIG. 2 is a schematic view of a subsea installation system during installation of subsea components, according to one implementation.

The disruptive coupling device 120 may be disposed externally to any subsea component of the subsea system 100 or disposed internally within a component of the subsea system 100. The disruptive coupling device 120 may be directly or indirectly coupled to a subsea equipment component. For example, the disruptive coupling device 120 may be mounted to one subsea component 114, and connected to another subsea component 115 using connections such as piping or other mechanical connections. Disruptive coupling devices such as 120 may be coupled to subsea components and configured to leverage existing or added mass in the form of a fluid or structural element to reduce a modal response of the subsea component while the subsea component is being installed, as illustrated in FIG. 2 with respect to the first set of subsea equipment 102, and/or after the subsea equipment is installed and while the subsea components are being operated (as illustrated in FIG. 1).

In one embodiment, which can be combined with other embodiments, the disruptive coupling device 120, external to a first subsea component 103, acts as a compressible degree of freedom and is configured to couple with a volume of the surrounding seawater 116 in response to a load 122 applied to the first subsea component 103 by the seawater 116 of the ocean, for example, by waves or currents. The coupled seawater effectively acts as a slave mass to the subsea component and the compressibility of the disruptive coupling device 120 disrupts the phase lag of the slave mass. The resulting coupled system no longer has the same coherent set of modes as the first subsea component 103 in absence of the disruptive coupling device 120 as the slave mass is prevented from participating in exciting a response in the first subsea component 103. The resulting optimized modal gain profile, e.g. the response of the first subsea component 103 with respect to the magnitude of the applied load or loading frequency, of the first subsea component 103 has reduced amplitude peaks. The load 122 may be applied to a subsea component such as the first subsea component 103 by at least a current of the seawater 116 and/or one or more waves of the seawater 116. Rather than disrupting the flow of the surrounding water and thus adding significant drag to the first subsea component 103, such that VIV strakes do, the compliant degree of freedom will alter the fundamental response of the system independently of the applied load. The disruptive coupling device 120 does not need to be tuned to a specific load.

The disruptive coupling device 120 may include but is not limited to an added mass system or existing structural element that acts as an added mass which is attached to the subsea equipment. The added mass is mechanical in nature and includes a compressible degree of freedom such that the phase lag of the coupled added mass is independent of the load applied to the equipment. Rather than dissipating energy, such as a tuned mass damper does, the compliant degree of freedom will alter the fundamental response of the system independent of the applied loading frequency. In one embodiment, which can be combined with other embodiments, a mitigation frequency of the disruptive coupling device 120 is independent of a loading frequency of the load 122. The disruptive coupling device 120 is configured to affect the response of the first subsea component 103 in response to the load 122 being applied to the first subsea component 103.

In one embodiment, which can be combined with other embodiments, a disruptive coupling device 120 is configured within or attached to a second subsea component 105 to move a volume of fluid through the disruptive coupling device 120 in order to achieve damping. In one example, the disruptive coupling device 120 moves the fluid using a pump, valve or otherwise variable orifice. In one example, the fluid moved by the disruptive coupling device 120 includes at least a portion of external fluid surrounding the disruptive coupling device 120. The fluid moved by the disruptive coupling device 120 may include but is not limited to water, seawater, air, nitrogen, oil, and/or any subsea production fluid. The fluid moved by the disruptive coupling device 120 is part of a flow path that may or may not be separated from the seawater 116 of the surrounding ocean. The flow path may, for example, be separated from the seawater 116 of the surrounding ocean by the body of the disruptive coupling device 120, such as but not limited to a bladder, or partially by the body of the disruptive coupling device, such as but not limited to a membrane. The flow path may or may not be separated from the seawater 116 partially by the body of the second subsea component 105. The flow path may be open to the surrounding water. The present disclosure contemplates that the disruptive coupling device 120 may be enclosed inside a structure filled with fluid, such as a storage vessel, such that the fluid coupled with the disruptive coupling device 120 would be water or any fluid or chemical involved in subsea production systems. The disruptive coupling device 120 can include an enclosed volume. The disruptive coupling device 120 can include a protrusion that protrudes from the subsea component. The disruptive coupling device 120 may be disposed in a subsea storage container. Various other fluids could also be used such as but not limited to gas such as air, or nitrogen, or other fluids of different density such as oil.

In one embodiment, which can be combined with other embodiments, the disruptive coupling device 120 is configured within or attached to the second subsea component 105 and is a compliant closed vessel such as a balloon or bladder. The enclosed fluid is compressible such that a volume of the enclosed fluid reduces upon application of pressure to the enclosed fluid. The volume of the disruptive coupling device 120 will vary in response to the applied load. Furthermore, the disruptive coupling device 120 is configured to couple with surrounding fluid that will act as a slave mass. The slave mass is prevented from exciting a large response in the second subsea component 105. The disruptive coupling device 120 may be enclosed inside a structure filled with fluid, such as a storage vessel, such that the fluid coupled with the device would be water or any fluid or chemical involved in subsea production systems.

In one embodiment, which can be combined with other embodiments, a disruptive coupling device 120 is a chamber filled with a fluid at the top and with seawater or other fluid at the bottom. Such an embodiment is further described in relation to FIG. 3. The two top and bottom fluids may be separated by a valve or the chamber may not have any physical barrier between the two top and bottom fluids. The disruptive coupling device 120 is configured to move the surrounding fluid into or out of the disruptive coupling device 120 in response to the load 122. The movement of a mass of fluid into or out of the disruptive coupling device 120 increases, decreases, or re-distributes the mass of the subsea component to alter the response of the subsea component to loads.

The reduction of the loading acting on the first subsea component 103 and the alteration of the mass of the first subsea component 103 facilitate an increased weather window of the first subsea component 103 and an increased operational lifespan of the first subsea component 103, which can be affected by subsea conditions such as loadings from subsea currents. For example, the reducing of the loading and altering the mass of the first subsea component 103 facilitate reducing vibration and/or movement of the first subsea component 103 during the loading 122 acting on the first subsea component 103. Installing structures and operating structures in subsea environments can be difficult, timely, and expensive. Hence, facilitating increased weather windows and operational lifespans for subsea components can facilitate savings in cost and time, and reductions in operational difficulty. The disruptive coupling device 120 facilitates achieving these benefits in a manner that promotes design simplicity, reduced design size, and reduced costs.

The present disclosure contemplates that the subsea system 100 may be an active system such that a controller 140 is included to control operation or aspects of the disruptive coupling device 120. The disruptive coupling device 120 also facilitates the benefit of the subsea system 100 being a passive system such that a controller is not needed for the disruptive coupling device 120 to operate. As an example, the disruptive coupling device 120 can be configured to capture fluid, move fluid, and/or affect the mass of the first subsea component 103 in response to the load 122 of the waves and current without a controller to control the disruptive coupling device 120. The disruptive coupling device 120 also does not need to be tuned to a specific loading of the load 122 of the waves and current (or tuned to a specific vibration mode) and can mitigate vibration and movement of the first subsea component 103 across a variety of loadings. The disruptive coupling device 120 can also facilitate vibration and/or movement reduction for a variety of sizes of the first subsea component 103 and is not limited to a single size of the first subsea component 103.

FIG. 2 is a schematic view of a subsea installation system 200 during installation of subsea components, according to one implementation. FIG. 2 illustrates the subsea installation system 200 during installation of the subsea component 105 and the subsea component 103 in a subsea environment. In one example, which can be combined with other examples, the subsea component 103 is a riser having a disruptive coupling device 120, and the subsea component 105 is a pipeline end termination (PLET) or a pipeline end manifold (PLEM) having a disruptive coupling device 120.

In the implementation shown in FIG. 2, each of the disruptive coupling devices 120 are used to couple with an external fluid, capture an external fluid, move a fluid, and/or affect a mass of the respective subsea component 103, 105 during installation of the subsea components 103, 105 toward the seafloor 104. The subsea installation system 200 includes an installation vessel 130 that is moved adjacent to the floating offshore structure 108. The subsea components 103, 105 are at least partially supported on the installation vessel 130. The installation vessel 130 may be used to couple the subsea component 103 to the floating offshore structure 108, and the installation vessel 130 may be used to lower the subsea components 103, 105 toward the seafloor 104. The installation vessel 130 includes one or more lifting devices 131 (such as one or more cranes and/or one or more davits) to lift and/or lower the subsea components 103, 105.

Figure 3:
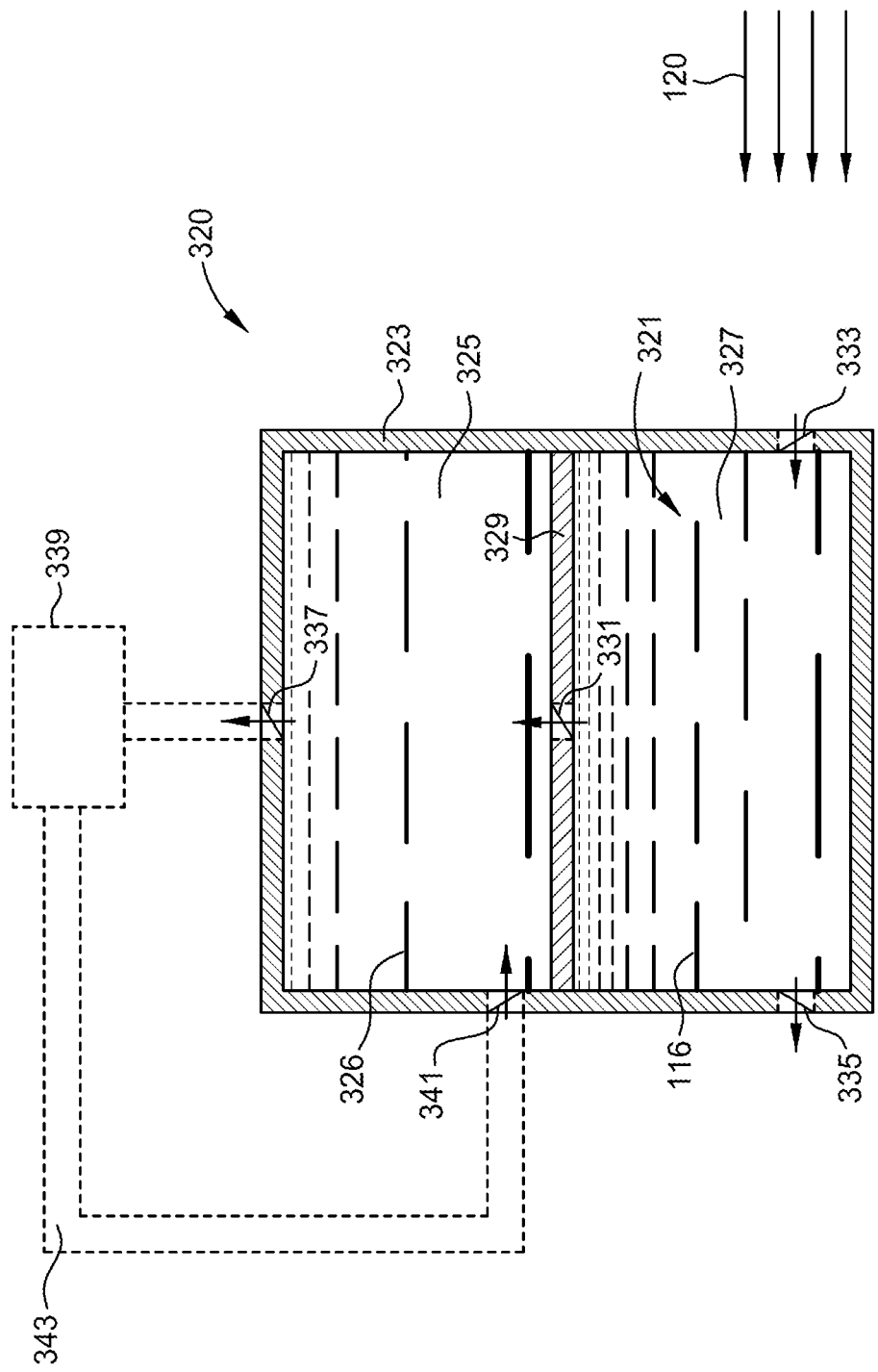
FIG. 3 is a schematic partial view of a disruptive coupling device, according to one implementation.

FIG. 3 is a schematic partial view of a disruptive coupling device 320, according to one implementation. The disruptive coupling device 320 may be used as the disruptive coupling devices 120 shown in FIGS. 1 and 2. The disruptive coupling device 320 includes a chamber 321 within a chamber housing 323. The chamber 321 is filled with a first fluid 326 in an upper portion 325 of the chamber 321 and with a second fluid (seawater 116 or other fluid) in a lower portion 327 of the chamber 321. The disruptive coupling device 320 includes a barrier wall 329 separating the upper portion 325 from the lower portion 327. The barrier wall 329 includes a valve 331, such as a one-way check valve, disposed in a flow opening of the barrier wall 329. The valve 331 allows seawater 116 or other fluid from the lower portion 327 to flow into the upper portion 325. The present disclosure contemplates that another membrane may be used in place of the barrier wall 329 and the valve 331. The present disclosure also contemplates that the barrier wall 329 and the valve 331 may be omitted. In one embodiment, which can be combined with other embodiments, the first fluid 326 has a density that is lesser than the density of the seawater 116 or other fluid.

In one embodiment, which can be combined with other embodiments, movement of the first fluid 326 has a compressible flow with a Mach number of 0.3 or higher. In one embodiment, which can be combined with other embodiments, the first fluid 326 is compressible such that a volume of the first fluid 326 reduces upon application of pressure to the first fluid 326. In one embodiment, which can be combined with other embodiments, the first fluid 326 includes one or more of water, seawater, air, nitrogen, oil, or a subsea production fluid.

The disruptive coupling device 320 is configured to move surrounding fluid (such as the seawater 116) into and/or out of the disruptive coupling device 320 (e.g., the lower portion 327) in response to the load 122. In one embodiment, which can be combined with other embodiments, a first one-way check valve 333 disposed in a first flow opening formed in the chamber housing 323 facilitates allowing the seawater 116 to flow into the lower portion 327 and a second one-way check valve 335 disposed in a second flow opening formed in the chamber housing 323 facilitates allowing the seawater 116 to flow out of the lower portion 327. In one embodiment, which can be combined with other embodiments, a third one-way check valve 337 disposed in a third flow opening formed in the chamber housing 323 facilitates egress of the first fluid 326 at a top of the chamber 321 to a designated area 339. The designated area 339 is internal or external to the respective subsea component associated with the disruptive coupling device 320. The designated area 339 is outside of the chamber 321. A fourth one-way check valve 341 in a fourth flow opening formed in the chamber housing 323 facilitates allowing filling or refilling of the first fluid 326 into the upper portion 325 through a flow path 343. The movement of a mass of fluid (such as the seawater 116 or other fluid, and/or the first fluid 326) into or out of the disruptive coupling device 320 increases, decreases, or re-distributes the mass of the respective subsea component to alter the response of the subsea component to loads (such as the load 122 of the surrounding seawater 116). Benefits of the present disclosure include at least: a greater installation window for subsea structures; reduced installation time for subsea structures; cost savings for vibration and movement mitigation; more compact and simpler designs for vibration and movement mitigation; and longer operational lifespans for subsea structures.

Aspects of the present disclosure include at least disruptive coupling devices coupled to subsea structures; using a disruptive coupling device while a subsea structure is installed and operated on or adjacent to a seafloor; and using a disruptive coupling device while a subsea structure is being installed. It is contemplated that one or more of the aspects disclosed herein may be combined. Moreover, it is contemplated that one or more of these aspects may include some or all of the aforementioned benefits.

It will be appreciated by those skilled in the art that the preceding embodiments are exemplary and not limiting. While the foregoing is directed to embodiments of the present disclosure, other and further embodiments of the disclosure may be devised without departing from the basic scope thereof. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described.

We claim:

1. A disruptive coupling device comprising:
   a chamber housing;
   a chamber disposed within the chamber housing, the chamber having a first fluid in an upper portion of the chamber, and a second fluid in a lower portion of the chamber;
   a barrier wall and a check valve disposed between the lower portion and the upper portion, the check valve configured to allow the second fluid to flow out of the lower portion and into the upper portion; and
   a second check valve to allow the second fluid to flow into the lower portion.

2. The disruptive coupling device of claim 1, wherein the disruptive coupling device is configured to be coupled to a subsea system.

3. The disruptive coupling device of claim 2, wherein the subsea system is disposed as a stand-alone system on a seafloor.

4. The disruptive coupling device of claim 2, wherein the disruptive coupling device is mountable to a subsea component, configured to be formed in the subsea component, or connectable to the subsea component of the subsea system.

5. The disruptive coupling device of claim 4, wherein the subsea component comprises at least one of a riser, an umbilical, a flowline, a manifold, an in-line structure, a jumper, a pipeline end termination (PLET), a pipeline end manifold (PLEM), subsea storage equipment, subsea processing equipment, a midwater buoy, a midwater arch, or a midwater structure.

6. The disruptive coupling device of claim 4, further comprising at least one of a valve, a pump, a variable orifice, a damper, a protrusion that protrudes from the subsea component, an opening formed in the subsea component, or an enclosed volume enclosing the fluid.

7. The disruptive coupling device of claim 1, wherein the second fluid is at least a portion of a seawater.

8. The disruptive coupling device of claim 1, wherein the first fluid comprises one or more of water, air, nitrogen, oil, or a subsea production fluid.

9. The disruptive coupling device of claim 1, wherein a mitigation frequency of the disruptive coupling device is independent of a loading frequency of a seawater.

10. The disruptive coupling device of claim 1, wherein the first fluid is compressible.

11. A disruptive coupling device comprising:
    a chamber housing;
    a chamber disposed within the chamber housing, the chamber having a first fluid in an upper portion of the chamber, and a second fluid in a lower portion of the chamber, wherein the second fluid is at least a portion of seawater; and
    a barrier wall and a check valve disposed between the lower portion and the upper portion, the check valve configured to allow the second fluid to flow out of the lower portion and into the upper portion.

12. A disruptive coupling device comprising:
    a chamber housing;
    a chamber disposed within the chamber housing, the chamber having a first fluid in an upper portion of the chamber, and a second fluid in a lower portion of the chamber, wherein a density of the first fluid is lesser than a density of the second fluid; and
    a barrier wall and a check valve disposed between the lower portion and the upper portion, the check valve configured to allow the second fluid to flow out of the lower portion and into the upper portion.

13. The disruptive coupling device of claim 12, wherein the second fluid is at least a portion of a seawater.

14. A disruptive coupling device comprising:
a chamber housing;
a chamber disposed within the chamber housing, the chamber having a first fluid in an upper portion of the chamber, and a second fluid in a lower portion of the chamber; and
a barrier wall and a check valve disposed between the lower portion and the upper portion, the check valve configured to allow the second fluid to flow out of the lower portion and into the upper portion; and
a second check valve to allow the first fluid to flow out of the upper portion and into a designated area outside of the chamber.

15. The disruptive coupling device of claim 14, wherein the second fluid is at least a portion of a seawater.

16. A disruptive coupling device comprising:
a chamber housing;
a chamber disposed within the chamber housing, the chamber having a first fluid in an upper portion of the chamber, and a second fluid in a lower portion of the chamber; and
a barrier wall and a check valve disposed between the lower portion and the upper portion, the check valve configured to allow the second fluid to flow out of the lower portion and into the upper portion; and
a second check valve disposed in a second opening formed in the chamber housing to allow the second fluid to flow out of the lower portion and out of the chamber.

17. The disruptive coupling device of claim 16, wherein the second fluid is at least a portion of a seawater.

* * * * *